United States Patent [19]

Skokan

[11] 3,795,822

[45] Mar. 5, 1974

[54] MULTIEMITTER COUPLED LOGIC GATE

[75] Inventor: Zdenek E. Skokan, Milpitas, Calif.

[73] Assignee: Hewlett-Packard Company, Palo Alto, Calif.

[22] Filed: Aug. 14, 1972

[21] Appl. No.: 280,363

[52] U.S. Cl. .................... 307/215, 307/218, 307/248

[51] Int. Cl. ........................ H03k 19/34, H03k 19/36

[58] Field of Search ... 307/215, 203, 230, 218, 248, 307/299, 300; 317/235 Z

[56] References Cited

UNITED STATES PATENTS

| | | | |
|---|---|---|---|
| 3,345,518 | 10/1967 | Thompson | 307/215 X |
| 3,351,782 | 11/1967 | Narud et al. | 307/218 X |
| 3,629,609 | 12/1971 | Pedersen | 307/215 X |
| 3,641,362 | 2/1972 | Gamble | 307/215 |
| 3,704,383 | 11/1972 | Ault et al. | 307/215 |

*Primary Examiner*—Andrew J. James
*Attorney, Agent, or Firm*—A. C. Smith

[57] ABSTRACT

The emitters and bases of two transistors, at least one of which has more than one emitter, are used as inputs, while the collectors and emitters are used as outputs. The collector of the first transistor is connected to the base of the second transistor. The collectors of both transistors are electrically biased. A resistor is connected between the bias source and the collector of the first transistor. A third transistor, connected as a diode, clamps the voltage across the resistor to a selected value even if more than one input to the first transistor is low. With changes in inputs and outputs, the circuit can function as a basic AND-OR gate, a trigger circuit for pulse shaping, an R-S latch, and a gated latch. By combination of basic gates, more complex logic functions can be achieved.

4 Claims, 2 Drawing Figures

MULTIEMITTER COUPLED LOGIC GATE

BACKGROUND OF THE INVENTION

Many of the existing logic gates were designed without full consideration for medium or large scale integration. Consequently these gates consume excessive amounts of power, operate slowly, and are difficult to interface with other logic gates. For example, the basic TTL gates — NAND and NOR — always perform an unnecessary inversion. Thus if the true functions AND or OR are desired, two inversions in sequence are necessary. These inversions are undesirable because they consume power and decrease gate response time. Accordingly it is an objective of this invention to provide a more efficient family of logic gates suitable for large scale integration.

SUMMARY OF THE INVENTION

The invention utilizes a first transistor having at least one emitter, a base, and a collector. The collector of this transistor is connected to the base of a second transistor. Means for biasing both transistors are connected to the collectors of the transistors. A resistive element is connected between the collector of the first transistor and the means for biasing. To prevent saturation of the first transistor, a third transistor or diode may be connected between the means for biasing and the connection between the collector of the first transistor and the base of the second transistor. To perform other logic functions a feedback loop from one of the emitters of the second transistor may be utilized. Bistable memory functions are performed by connecting an emitter of the first transistor to an emitter of the second transistor.

DESCRIPTION OF THE PREFERRED EMBODIMENT

Figure 1:
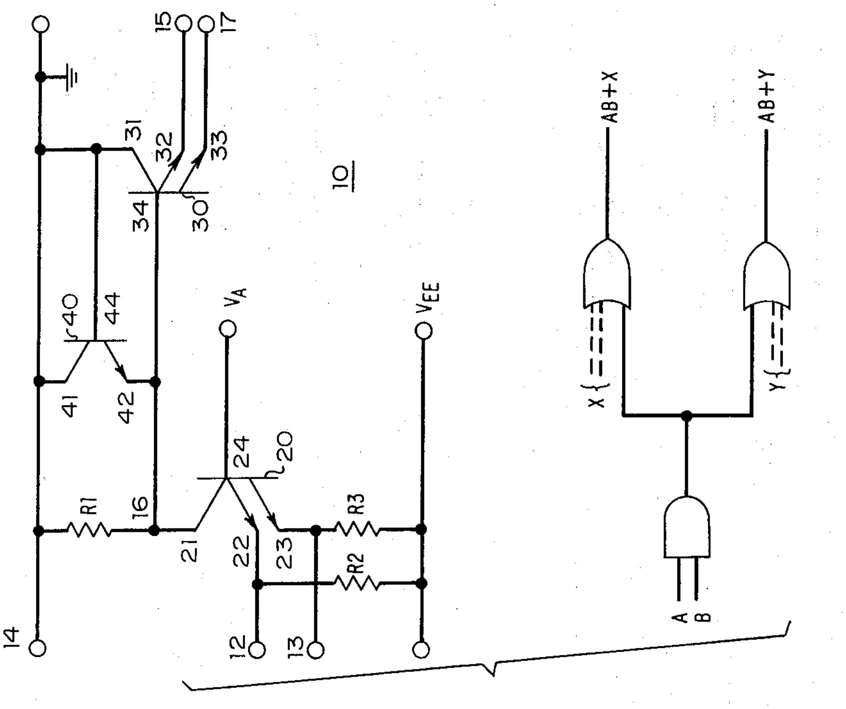
FIG. 1 shows a schematic of the logic gate in its preferred embodiment. Also shown is a block diagram.

Referring now to FIG. 1 there is shown a schematic of the preferred embodiment of a logic gate 10. Emitters 22 and 23 of transistor 20 provide the gate inputs from terminals 12 and 13. The collector 21 of the transistor 20 is connected to the common terminal 14 through resistor $R_1$. The base 24 of transistor 20 is biased from power source $V_A$. Transistor 30 provides current amplification and follows the state of location 16 in the circuit. The base 44 and collector 41 of transistor 40 are connected to the common terminal 14. The emitter 42 of transistor 40 is connected to the base 34 of transistor 30 and the collector 21 of transistor 20. Transistor 40 thus functions as a diode to limit the voltage swing of the collector 21, and thereby prevent saturation of transistor 20. Outputs 15 and 17 are taken at the emitters 32 and 33 of transistor 30.

For illustrative purposes only, assume logic level 1 (high) is −0.8v. and logic level 0 (low) is −1.6v. Let $V_A$ = −0.4v. and $V_{EE}$ = 1.6v. or more negative. Then for $R_1$ = 1,000, $R_2$=$R_3$=400. (If $R_1$ = 1,000 and $V_{EE}$ = −2v. then $R_2$=$R_3$=800.) The states of various locations in the circuit are shown on the table below.

| Inputs | | Result | | |
|---|---|---|---|---|
| Location 12 | 13 | 16 | 15 (and 17) | 15 (and 17)* |
| −0.8v. | −0.8 | 0 | −0.8 | −0.8 |
| −0.8 | −1.2 | −0.8 | −1.6 | −1.2 |
| −1.2 | −0.8 | −0.8 | −1.6 | −1.2 |
| −1.2 | −1.2 | −0.8 | −1.6 | −1.2 |

15*:If output 15 is loaded with only a resistor the voltage at 15 will go up to −1.6v. If output 15 is loaded with the next logic gate it will clamp at −1.2v.

The input voltages tend to go to −1.6v. but are clamped by input transistor 20 at −1.2v. Transistor 40 functions as a swing limiting diode, i.e., it clamps the voltage across $R_1$ to 0.8v. even if both inputs 12 and 13 are low.

Figure 2:
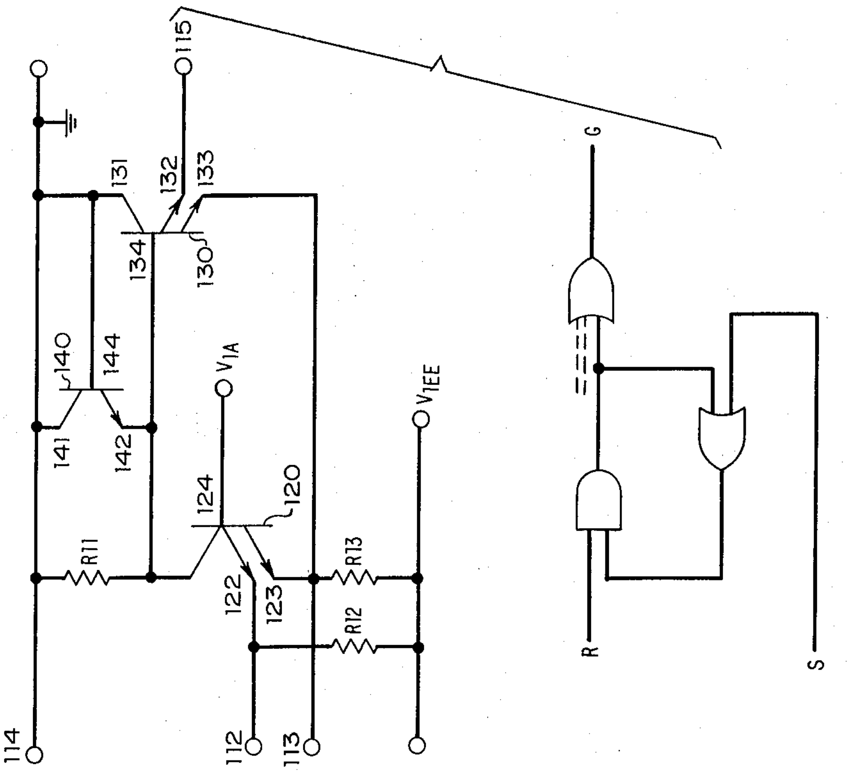
FIG. 2 shows a schematic of an alternative embodiment of the logic gate as a memory element together with a logic block diagram.

An alternative embodiment of the logic gate is shown in FIG. 2. The elements shown in FIG. 2 are given numbers corresponding to FIG. 1 but with a prefix of 1, e.g., element 20 in FIG. 1 is element 120 in FIG. 2.

One connection is present in FIG. 2 which is not in FIG. 1. This is the connection between emitters 123 and 133. The circuit shown in FIG. 2 may function as a trigger, as a R-S latch, or with the addition of a data input applied to terminal 112, as a gated latch.

I claim:

1. A gating circuit comprising:

a. first gain element having an input circuit and an output circuit, the input circuit having a base electrode and a plurality of emitter electrodes common to the input circuit and the output circuit, the output circuit including a collector electrode and said plurality of emitter electrodes;

a second gain element having an input circuit and an output circuit, the input circuit having a base electrode and at least one emitter electrode means common to the input circuit and the output circuit, the output circuit including a collector electrode and said emitter electrode;

means operatively connecting the collector electrode of the first gain element to the base electrode of the second gain element;

bias means connected to the electrodes of the first and second gain elements for supplying bias signals to the first gain element for operation thereof in common base configuration and for supplying bias signals to the second gain element for operation thereof in the common collector configuration;

first circuit means connected to the collector electrode of the first gain element for limiting the level of bias signal thereon substantially independent of input signals applied to the emitter electrodes of the first gain element;

second circuit means connected to selected ones of the emitter electrodes of the first gain element for applying input signals thereto; and means connected to an emitter electrode of the second gain element for providing an output signal representative of a logic combination of signals applied to the emitter electrodes of the first gain element.

2. A gating circuit as in claim 1 wherein a unidirectionally conducting element is connected to the collector electrode of the first gain element to prevent the saturation thereof.

3. A gating circuit as in claim 1 wherein:

the second gain element includes first and second emitter electrodes; and comprising:

means connected to one of the emitter electrodes of the second gain element for applying signal thereon to one of the emitter electrodes of the first gain element for producing an output on another emitter electrode of the second gain element which is a logic combination of signals applied to the emitter electrodes of the first gain element.

4. A gating circuit as in claim 1 wherein said bias means includes a resistive element connected between each of the emitter electrodes of the first gain element and a source of bias signal of greater magnitude than the bias signal appearing on the base electrode of said first gain element.

* * * * *